(No Model.)

P. P. HAYES.
CORN PLANTER.

No. 483,217. Patented Sept. 27, 1892.

Witnesses:

Inventor,
Peter P. Hayes,
By his Attorneys,

UNITED STATES PATENT OFFICE.

PETER P. HAYES, OF ELLENDALE, VIRGINIA.

CORN-PLANTER.

SPECIFICATION forming part of Letters Patent No. 483,217, dated September 27, 1892.

Application filed November 14, 1891. Serial No. 411,906. (No model.)

*To all whom it may concern:*

Be it known that I, PETER P. HAYES, a citizen of the United States, residing at Ellendale, in the county of Smyth and State of Virginia, have invented a new and useful Corn-Planter, of which the following is a specification.

This invention relates to corn-planters, and its objects are to provide a planter of cheap and simple construction that is adapted to automatically and in predetermined quantities drop corn at intervals, form a furrow for the same, and cover the furrow after such dropping; furthermore, to provide a dropping mechanism that will not permit of the escape of but the desired number of grains and will not injure the grain during dropping.

Other objects and advantages of the invention will appear in the following description, and the novel features thereof will appear in the appended claims.

Figure 1:
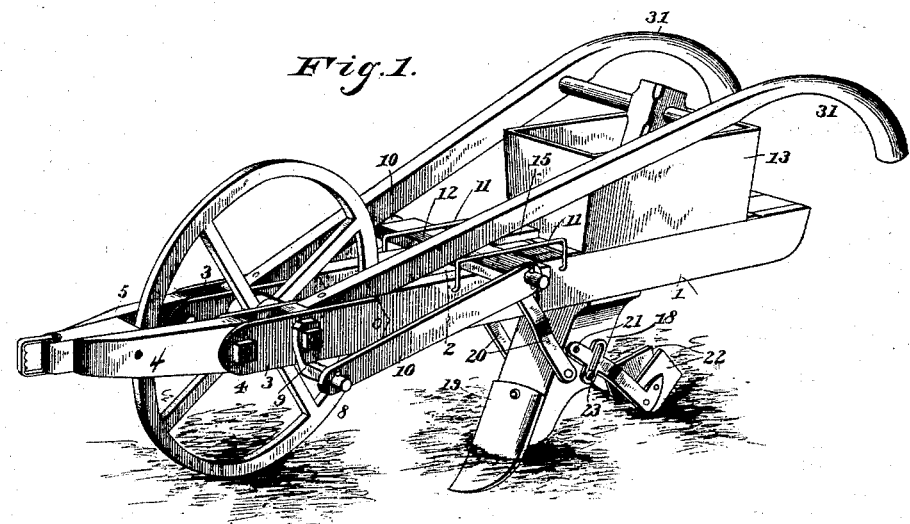
Figure 2:
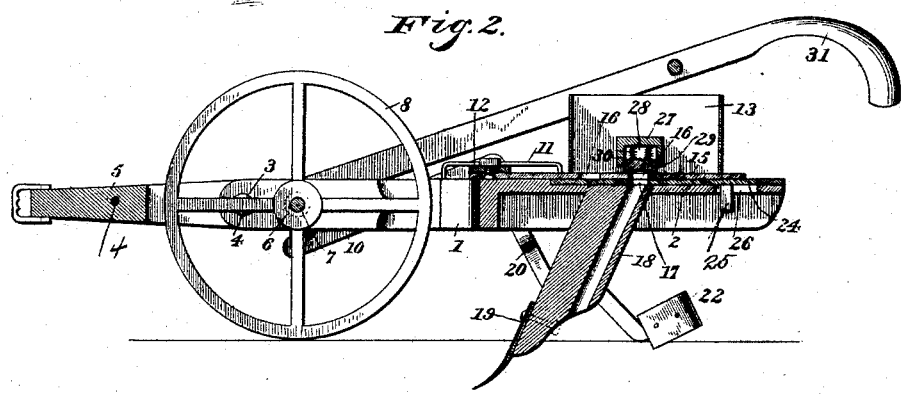
Figure 3:
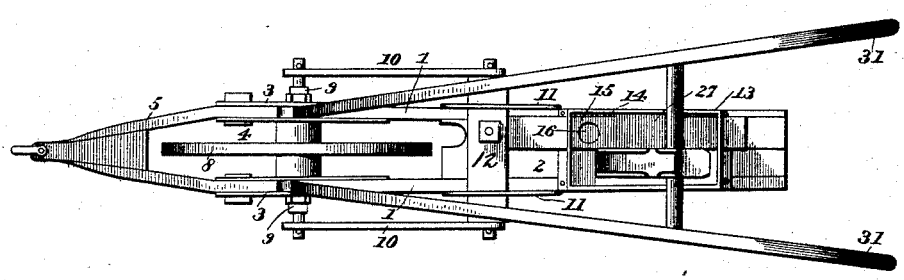

In the drawings, Figure 1 is a perspective of a corn-planter constructed in accordance with my invention. Fig. 2 is a longitudinal section thereof. Fig. 3 is a plan.

Like numerals indicate like parts in all the figures of the drawings.

1 designates a pair of side bars or beams which have their rear halves connected by a platform 2 and have their front ends embraced by pairs of metal straps 3, in the front ends of which is pivoted, as at 4, a draft-bail 5. Bearings 6 are formed in the metal straps and beams 1, and in the same is journaled an axle 7, carrying a ground-wheel 8, made fast thereto and turning therewith. Beyond the bearings the axle terminates in a pair of opposite cranks 9, to each of which is loosely connected a pair of rearwardly-disposed pitmen 10. Opposite longitudinal guides or keepers 11 are mounted upon the beams 1 in rear of the axle, and in the guides is located a transversely-disposed reciprocating head or bar 12, the ends of which extend beyond the keepers and are reduced for loose connection with the rear ends of the aforesaid pitmen.

13 designates the hopper, which is mounted upon the platform supported by the beams, and has its bottom provided with a longitudinally-disposed slot or opening 14, in which is mounted for reciprocation a seed-slide 15, the front end of which is connected to the transverse reciprocating bar 12, so that any motion of said bar caused by the pitmen is transmitted to the slide. The slide is provided with one or a series of seed-openings 16, adapted to accommodate one or more seed, which by the reciprocations of the slide are thrown into register with a corresponding though single perforation 17 formed in a cut-off plate hereinafter described.

A seed-spout 18 depends from the under side of the platform and terminates at its lower end in a furrow-opening shovel or plow 19, and braces 20 connect the lower end of the spout with the opposite side beams 1. To the opposite sides of the seed-spout there are pivoted, as at 21, the upper or shank ends of a pair of covering-blades 22, which in rear of the spout are deflected so as to dispose the dirt thrown up by the shovel back into the furrow after the seed has been dropped. The shanks of the deflecting-blades are widened near their middles and are transversely slotted with relation to the shanks, and through the same are passed adjusting-bolts 23, whereby the blades may be raised or lowered, as occasion may require.

The platform of the machine is provided with a shallow groove immediately under the seed-slide of the hopper, and in the same is mounted a metal cut-off plate 24, having a depending lug 25, which projects downwardly through an opening 26 in the platform and below the same forming a handle to facilitate moving the plate. This plate takes the wear of the slide from the wood composing the platform, and hence lends durability.

27 designates a small cubical block mounted in the hopper-bottom immediately over the seed-slide and the seed-opening in the platform. This block is provided upon its under side with a recess 28, and in the same is located a smaller metal block 29, concaved upon its under side, as shown, and lightly pressed upon the seed-slide through the medium of a coiled spring 30, interposed between the two blocks. By means of this spring-pressed block more than the desired number of seed are prevented from collecting in the seed-openings of the slide and passing out through the seed-opening of the platform into the spout, and, furthermore, no cutting or injuring of the seed can take place, in that previous to the same the block would yield to pressure and permit the seed to pass that might be protruding slightly above the level of the slide.

This completes the construction, with the exception of the pair of handles 31, which are of the usual construction, and the operation may be briefly stated as follows: The hopper is filled with seed and the machine started, the shovel 19 serving to open the furrow. The revolutions of the ground-wheel causes a reciprocation of the transverse bar 12, which is operated through the medium of the pitmen, and the bar, being fast with the seed-slide, communicates a reciprocatory motion to the latter. As the seed-slide passes under the yielding block it carries one or more seed, as the case may be, with it, the said seed lodging in the opening in the slide when said opening comes under the body of seed within the hopper. The movement of the slide carries the seed opposite the opening in the platform through which the seed drops into the seed-spout, and is thereby delivered at the lower end of the latter into the furrow. The dirt of the furrow is now caught by the deflecting-blades and returned to its original position, thus filling the furrow and covering the seed.

It will be seen that the machine is automatic in its operation, and that by removing the slide and substituting others more grain to the hills may be dropped and the hills located closer together. The draft-bail is pivoted at the front end of the framework and terminates at its front end in a clevis, to which the usual draft appliances may be attached. By reason of the pivoting of the bail the undulations of the ground will not affect the efficient operation of the machine.

When it is desired to move from one field to another or in leaving or approaching the field of operation, the sliding cut-off plate 24 is moved to the rear, so that its orifice is out of alignment with the discharge seed-spout, and hence renders it impossible for the openings in the seed plate or slide to be thrown into register with the opening in the spout and cut-off plate. In this manner the escape of seed from the hopper is avoided and the machine may be readily transported, as will be obvious.

Having described my invention, what I claim is—

1. In a corn-planter, the combination, with a seed-spout terminating at its lower end in a shovel, of opposite covering-blades merging at their upper ends into shanks pivoted at their extremities to the sides of the spout and below their pivots provided with transverse slots, and bolts passed through the slots into the spout, whereby the said blades are made adjustable, substantially as specified.

2. In a corn-planter, the combination, with the opposite beams, of the platform 2, mounted thereon and provided with a shallow longitudinal recess, a sliding cut-off plate 24, mounted thereon and removable therefrom and provided with a peforation 17, registering with that of the platform and with a lug 25, depending through an opening in the platform and forming a handle below the same, a hopper mounted upon the platform, and a seed-slide 15, perforated and mounted in the hopper and adapted for sliding over the plate, substantially as specified.

In testimony that I claim the foregoing as my own I have hereto affixed my signature in the presence of two witnesses.

PETER P. HAYES.

Witnesses:
JOHN P. HILL,
G. B. ASHLIN.